United States Patent [19]

Oakes

[11] Patent Number: 4,495,699

[45] Date of Patent: Jan. 29, 1985

[54] HOLE PUNCH APPARATUS

[76] Inventor: Harry C. Oakes, 3771 Club Rd., Perry, N.Y. 14530

[21] Appl. No.: 431,286

[22] Filed: Sep. 30, 1982

[51] Int. Cl.[3] .................. B26F 1/00; B23B 5/00

[52] U.S. Cl. .................. 30/360; 30/361; 408/710

[58] Field of Search .................. 30/360, 361, 362; 408/710

[56] References Cited

U.S. PATENT DOCUMENTS

| | | | |
|---|---|---|---|
| 382,947 | 5/1888 | Brown | 30/361 |
| 1,315,100 | 9/1919 | Dufresne | 408/710 |
| 2,222,064 | 11/1940 | Benner | 30/360 |
| 2,633,197 | 3/1953 | Nischan | 30/360 |
| 3,025,600 | 3/1962 | Leibinger | 30/360 |

FOREIGN PATENT DOCUMENTS

| | | | |
|---|---|---|---|
| 7402419 | 2/1974 | Netherlands | 30/360 |

*Primary Examiner*—Paul A. Bell
*Assistant Examiner*—Paul M. Heyrana, Sr.
*Attorney, Agent, or Firm*—Darby & Darby

[57] ABSTRACT

Hole punch apparatus comprises a worm and worm wheel whereby an ordinary electric drill can be employed to punch holes in sheet metal by means of a punch and die. The several disclosed structures variously comprise a shear pin for preventing overload, a handle for rapid engagement of the punch and die with the workpiece, bushings to protect against unusual torques, and special threads.

5 Claims, 7 Drawing Figures

HOLE PUNCH APPARATUS

BACKGROUND OF THE INVENTION

This invention relates to apparatus for punching holes in sheet metal and the like and, more particularly, to novel and highly effective hole punch apparatus that is unusually compact, light, easy to use, and inexpensive.

Electricians and others must frequently punch holes of fairly large diameter in sheet metal and the like in order to pass cable, etc. Large holes cannot conveniently be drilled in sheet metal, and the usual practice is first to drill a small hole and then to use a punch and die (hereinafter sometimes referred to collectively as "dies") to punch a hole of the required size. The punch and die are placed on opposite sides of the workpiece so that they are concentric with the drilled hole. A shaft is passed through an aperture in the die and through the drilled hole and engaged with the punch. Then by means of a hydraulic system or a system comprising hand operated levers the punch and die are drawn forcibly together, compressing the workpiece between them and cutting the hole of required size.

A good hydraulic system works very well but is expensive. Systems comprising hand operated levers work less well and require considerable effort to operate. Moreover, two handles are necessary, one normally being ratcheted to permit operation in a confined space and the other being provided merely for the purpose of offsetting the considerable torque that would otherwise be transmitted to the workpiece.

Both hydraulic systems and systems employing hand operated levers are bulky and heavy. Since these tools must generally be carried from one job to another, their bulk and weight constitute a serious drawback.

SUMMARY OF THE INVENTION

An object of the invention is to remedy the problems of prior hole punch apparatus noted above, and, in particular, to provide hole punch apparatus that is unusually compact, light, easy to use, and inexpensive.

Other objects of the invention are to provide hole punch apparatus that is powered by an ordinary electric hand drill, that is protected in various ways against both ordinary overload and unusual torques, that can easily freed in case of overload, and that can be employed rapidly.

The foregoing and other objects are attained in hole punch apparatus comprising a pair of cooperating dies respectively mountable on the near and far sides of a workpiece, a housing engageable with the near die, and a shaft supported within the housing, insertable through apertures formed in the near die and workpiece, and engageable with the far die. A worm wheel is threaded on the shaft, and a worm is engageable with the worm wheel. Drive means is engageable with the worm, whereby, when the drive means is actuated, the far die is drawn against the workpiece, compressing the workpiece between the near and far dies, and the near and far dies cooperate to punch a hole in the workpiece.

In accordance with one independent feature of the invention, the drive means includes a power tool such as an ordinary electric hand drill and means coupling the power tool and the worm. The coupling comprises a first portion rotatable by the power tool, a second portion rotatable with the worm, and shearable means cooperating with the first and second portions for normally constraining them to rotate together but shearing in case of overload to permit the first portion to be rotated by the power tool while the second portion remains stationary.

The second portion of the coupling may be formed with means, such as a pair of flats respectively formed on opposite sides thereof, facilitating engagement by a hand tool, whereby, when the shearable means shears, a hand tool can be employed to turn the worm in reverse and disengage the apparatus from the workpiece.

In accordance with another independent feature of the invention, handle means is provided integral with the shaft, whereby the shaft can be turned by hand to cause rapid engagement of the dies with the workpiece prior to actuation of the drive means.

In accordance with another independent feature of the invention, a pair of bushings is supported within the housing and mounted around the shaft on opposite sides of the worm wheel for resisting torques applied to the worm wheel about axes normal to the axis of the worm wheel.

In accordance with another independent feature of the invention, the worm wheel and the shaft engage each other by means of threads having load bearing faces that are substantially radial with respect to the axis of the shaft. The threads may be, for example, of buttress or acme type.

BRIEF DESCRIPTION OF THE DRAWINGS

A better understanding of the invention may be gained from a consideration of the following detailed description of the preferred embodiments, thereof, in conjunction with the appended figures of the drawing, wherein.

DESCRIPTION OF THE PREFERRED EMBODIMENTS

Figure 1:
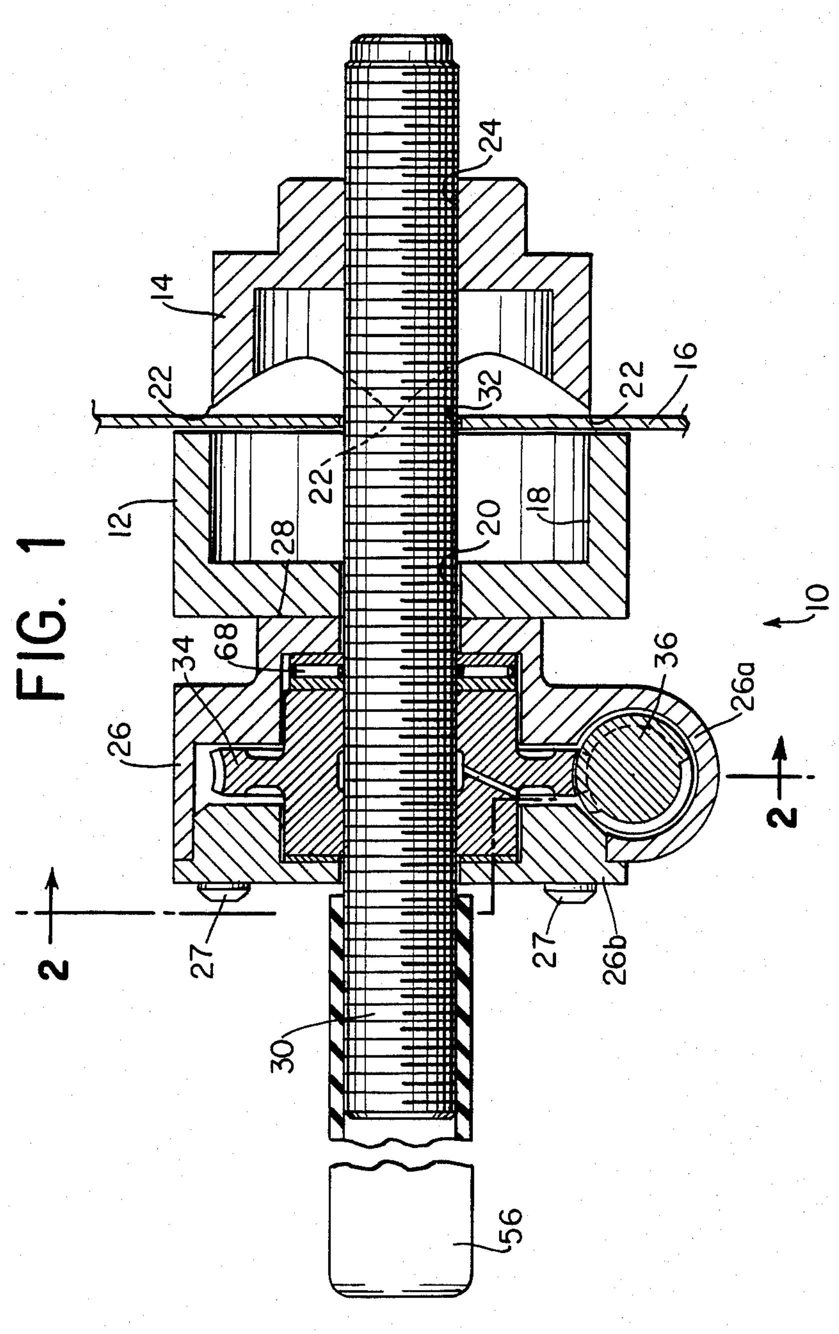
FIG. 1 is a sectional view taken substantially along the line 1—1 of FIG. 2, looking in the direction of the arrows, and showing a first preferred embodiment of apparatus constructed in accordance with the invention.
Figure 5:
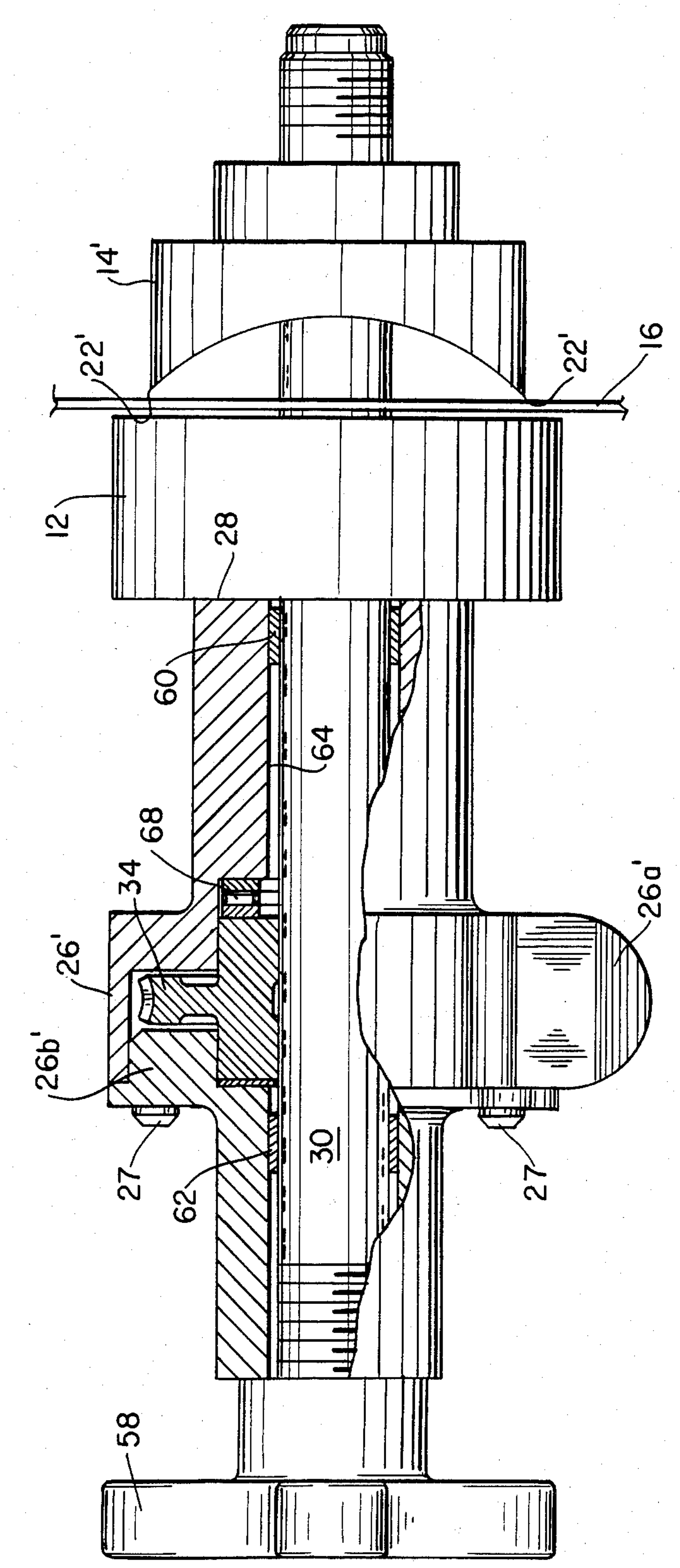
FIG. 5 is a view similar to FIG. 1, partly sectioned and broken away, of a second preferred embodiment of apparatus constructed in accordance with the invention.

FIGS. 1–4 show a first preferred embodiment of hole punch apparatus 10 constructed in accordance with the invention. The apparatus 10 comprises a pair of cooperating dies 12 and 14 (FIG. 1) mounted on the near and far sides, respectively, of a workpiece 16. The workpiece 16 may for example be a piece of sheet metal. The near die 12 is circular in cross section and formed with a cavity 18 and a central circular aperture 20. The far die 14, technically a punch, is also circular in cross section and is formed with a plurality of teeth (four teeth 22 as shown in FIG. 1 or two teeth 22' as shown in FIG. 5) and with a central circular aperture 24.

A housing 26 comprising parts 26a and 26b held together by bolts 27 is formed with a shoulder 28 by means of which it engages the near die 12. A threaded shaft 30 is supported within the housing 26, insertable through the aperture 20 formed in the near die 12, through an aperture 32 formed (for example using an ordinary electric drill) in the workpiece 16, and engageable with the far die 14. The shaft 30 passes loosely through the apertures 20 and 32 but engages the far die 14 securely, for example by a threaded connection through the aperture 24.

A worm wheel 34 (see especially FIGS. 1 and 2) is threaded on the shaft 30, and a worm 36 is engageable with the worm wheel 34.

Figure 2:
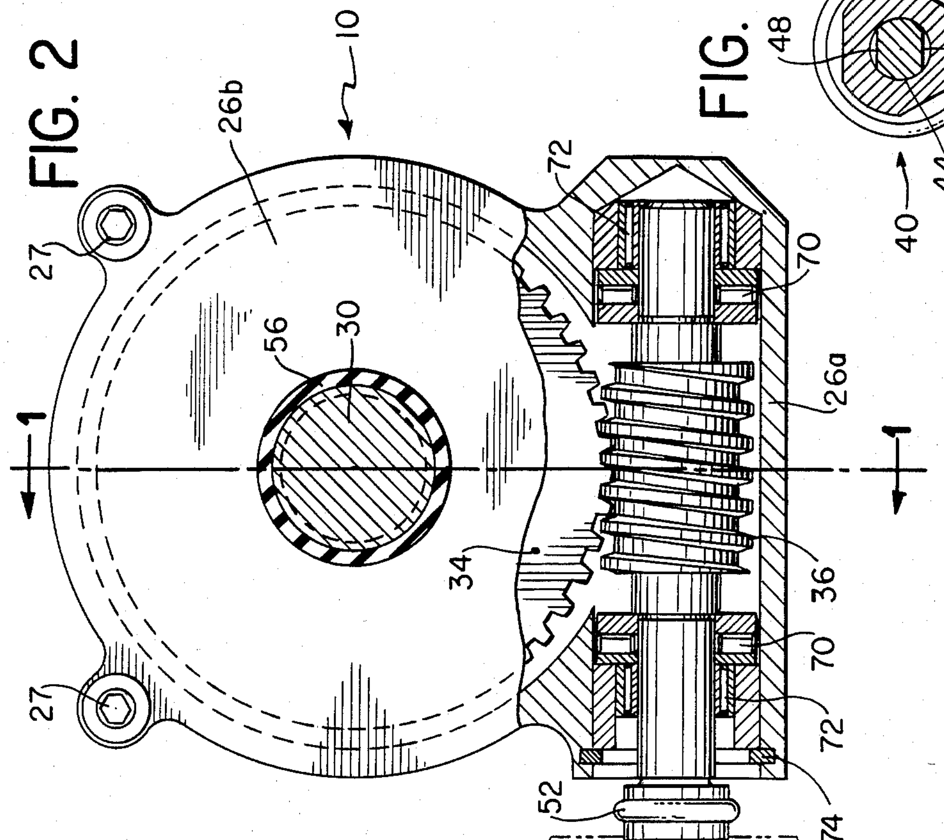
FIG. 2 is a partly sectional view taken substantially along the line 2—2 of FIG. 1 and looking in the direction of the arrows.
Figure 2:
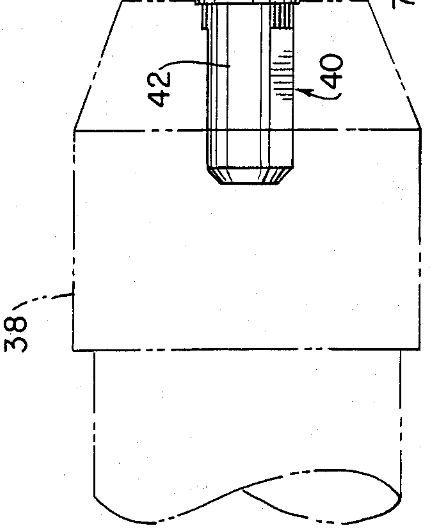
Figure 4:
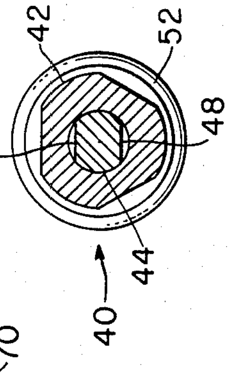
FIG. 4 is a sectional view taken substantially along the line 4—4 of FIG. 3 and looking in the direction of the arrows.
Figure 3:
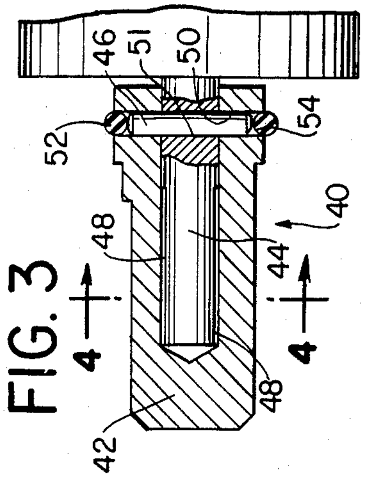
FIG. 3 is a fragmentary sectional view on an enlarged scale of a portion of the apparatus shown in FIG. 2.

Drive means 38, represented in FIG. 2 by the outline of a chuck of a conventional power drill, is provided. The drive means includes means 40 coupling the power tool and the worm 36.

Thus when the drive means 38 is actuated in the "forward" direction, the coupling means 40, worm 36 and worm wheel 34 are rotated in directions such that the threaded shaft 30 is drawn to the left as seen in FIG. 1. The far die 14 is therefore drawn against workpiece 16, compressing the workpiece 16 between the near die 12 and the far die 14, and the dies cooperate to punch a hole in the workpiece 16 having a diameter substantially equal to the diameter of the cavity 18 of the die 12 or to the outer diameter of the die 14. Once the dies engage the workpiece, they have no tendency to rotate about the axis of the shaft 30, and there is practically no resultant torque about said axis when the drive means 38 is actuated.

In accordance with one independent feature of the invention, the coupling means 40 comprises a first portion 42 rotatable by the power tool 38, a second portion 44 (FIG. 3) rotatable with the worm 36, and shearable means such as a shear pin 46 cooperating with the first and second portions 42 and 44 for normally constraining them to rotate together but shearing in case of overload to permit the first portion 42 to be rotated by the power tool 38 while the second portion 44 remains stationary.

Preferably, the first portion 42 and second portion 44 are concentric, the first portion 42 surrounding the second portion 44, and the second portion 44 is formed with means facilitating engagement by a hand tool, whereby, when the sheer pin 46 shears, a hand tool can be employed (after removal of the outer portion 42) to grip the inner portion 44 to turn the worm 36 in reverse and disengage the apparatus 10 from the workpiece 16. The means facilitating engagement by a hand tool preferably comprises a pair of flats 48 (FIG. 4) respectively formed on opposite sides of the second portion 44.

The shear pin 46 passes through apertures 50, 51 which are respectively formed in the first and second portions 42 and 44 and which are aligned prior to inserting the shear pin 46. The shear pin 46 is held in place by an O-ring 52, which is accommodated within a circumferential groove 54 formed in the first portion 42.

In accordance with another independent feature of the invention, handle means such as an elastomeric covering 56 (FIG. 1) or a knob 58 (FIGS. 5 and 6) integral with the shaft 30 is provided, whereby the shaft 30 can be turned by hand to cause rapid engagement of the dies 12 and 14 with the workpiece 16 prior to actuation of the drive means 38. The handle means a can in fact be a portion of the shaft 30 proper. The drive means 38 acts through the worm 36 and worm wheel 34 in turning the shaft 30. Both connections (between the worm 36 and worm wheel 34 and between the worm wheel 34 and threaded shaft 30) have large reduction ratios, so that it can take a number of seconds to close up the dies 12 and 14 on opposite sides of the workpiece 16 using only the power source 38. Since the handle 56 or 58 is connected directly to the shaft 30, it provides a rapid means of bringing the dies 12 and 14 into engagement with the workpiece 16.

In accordance with another independent feature of the invention, the housing 26' (FIGS. 5 and 6) is elongated in an axial direction. In the embodiment of FIG. 5, a pair of bushings 60 and 62 is supported within the housing 26' and mounted around the shaft 30 on opposite sides of the worm wheel 34 for resisting torques applied to the worm wheel 34 about axes normal to the axis of the worm wheel 34. Such torques can develop, for example, when enlarging a previously punched hole which is large enough that one of the teeth 22 or 22' of the die 14 or 14' does not make contact with the workpiece 16, while another tooth 22 or 22' makes such contact. Such torques can also be generated when punching a hole at the edge of a workpiece so that, again, one or more teeth of the male die make contact with the workpiece and one or more teeth do not.

The bushings 60 and 62 are preferably spaced apart from the worm wheel 34 a substantial distance and are retained within the bore 64 of the housing 26' by a press fit. The shaft 30 fits loosely within the bushings 60 and 62 with a tolerance that is small so that only very limited twisting of the shaft 30 about axes normal to the axis of shaft 30 and worm wheel 34 is possible.

Figures 6, 7:
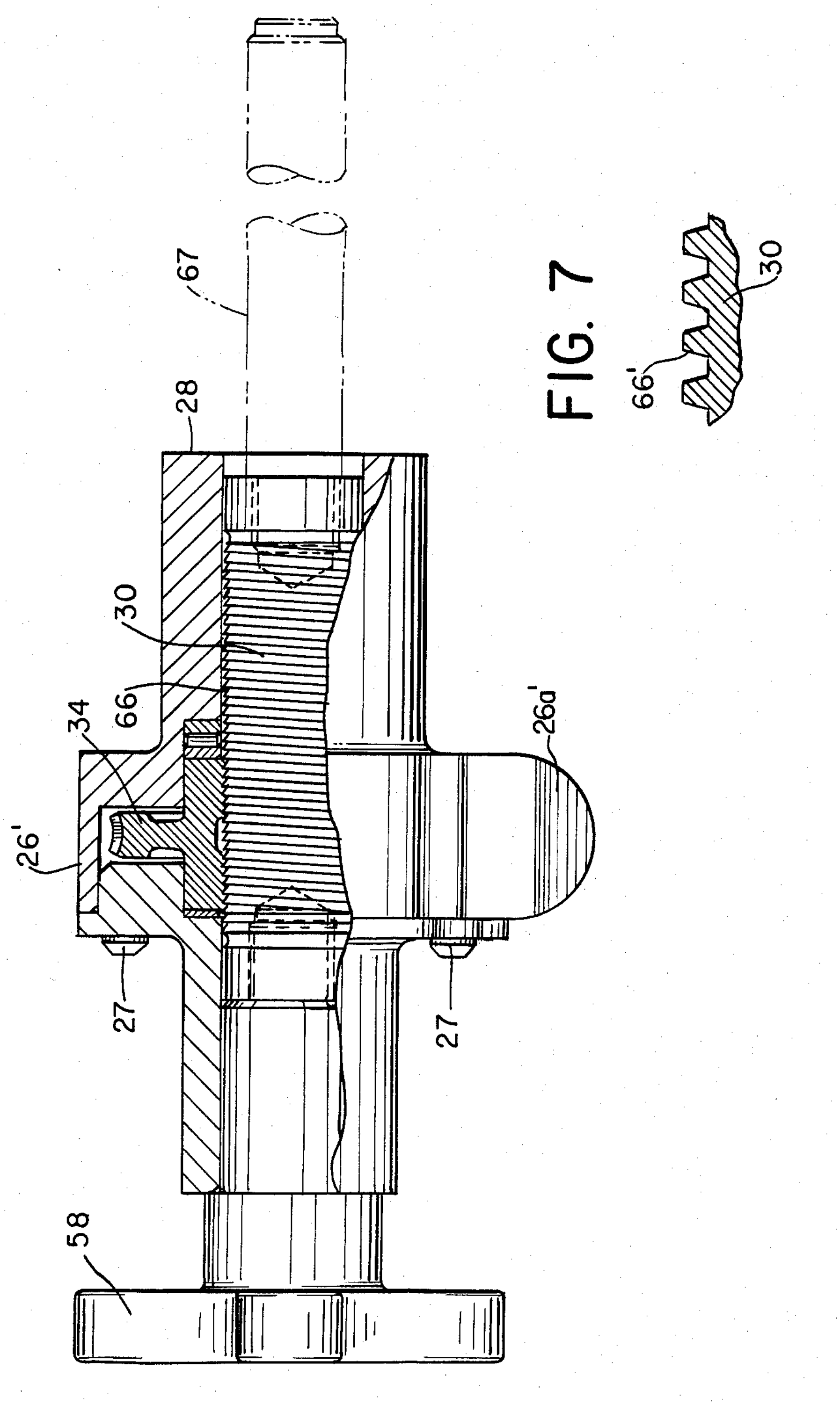
FIG. 6 is a view similar to FIGS. 1 and 5, partly sectioned and broken away, of a third preferred embodiment of apparatus constructed in accordance with the invention.
FIG. 7 is a fragmentary view on an enlarged scale of a portion of the structure of FIG. 6 showing an alternative form thereof.

In accordance with another independent feature of the invention, the worm wheel 34 and shaft 30 engage each other by means of threads having load bearing faces 66 (FIG. 6) that are substantially radial with respect to the axis of the shaft 30. Such threads may be of buttress type, as illustrated in FIG. 6. Alternatively, threads 66' of acme type, as illustrated in FIG. 7, may be provided. In either case, because of the substantially radial orientation of the load bearing faces of the threads, a large pulling force between the shaft 30 and the worm wheel 34 does not have any appreciable tendency to expand the internal diameter of the worm wheel 34. In the case of other types of threads, wherein the load bearing faces are not substantially radial, a radial force is generated which tends to enlarge the internal diameter of the worm wheel 34 and which can damage the apparatus in case it becomes overloaded and no shearable means is provided.

When special threads are employed as illustrated in FIGS. 6 and 7, an extension 67 is provided having a conventional thread suitable for engagement with a standard commercial punch.

The requisite bearings 68 and 70, 70 (FIGS. 1 and 2) absorb thrust loads on the worm wheel 34 and worm 36, respectively, and needle bearings 72, 72 absorb radial loads on the worm 36. The worm assembly is held in place by a snap ring 74.

Thus there is provided in accordance with the invention novel and highly effective hole punch apparatus that is more compact, lighter, easier to use, and less expensive than conventional apparatus. Electricians and others who have need of such apparatus already have at their disposal power drills which are used for making the small apertures in a workpiece through which the shaft 30 is passed. It is accordingly much simpler to use apparatus according to the invention than to carry additional apparatus comprising a hydraulic system or hand operated levers.

Many modifications of the preferred embodiments of the invention disclosed herein will readily occur to those skilled in the art. For example, it is within the scope of the invention to employ the punch 14 or 14' as the near die instead of as the far die, as shown. Accordingly, the invention is to be construed as including all structure which is within the scope of the appended claims.

What is claimed is:

1. Hole punch apparatus comprising:

first and second cooperating dies respectively mountable on opposite sides of a workpiece, said first die and workpiece each being formed with an aperture therein, a housing engageable with said first die, a shaft supported within said housing, insertable through said apertures, and engageable with said second die, a worm wheel threaded on said shaft, a worm engageable with said worm wheel, drive means including a power drill and means coupling said drill and said worm, whereby, when said drive means is actuated, said second die is drawn against said workpiece, compressing said workpiece between said first and second dies, and said first and second dies cooperate to punch a hole in said workpiece, said coupling means comprising a first portion rotatable by said drill, a second portion rotatable with said worm, and shearable means cooperating with said first and second portions for normally constraining them to rotate together but shearing in case of overload to permit said first portion to be rotated by said drill while said second portion remains stationary, and said first and second portions being concentric, said first portion surrounding said second portion, and said second portion being formed with means comprising a pair of flats respectively formed on opposite sides thereof for facilitating engagement by a hand tool, whereby, when said shearable means shears, a hand tool can be employed to turn said worm in reverse and disengage said apparatus from said workpiece.

2. Hole punch apparatus as in claim 1 further comprising handle means integral with said shaft, whereby said shaft can be turned by hand to cause rapid engagement of said dies with said workpiece prior to actuation of said drive means.

3. Hole punch apparatus as in claim 2 further comprising a pair of bushings supported within said housing and mounted on opposite sides of said worm wheel for resisting torques applied to said worm wheel about axes normal to the axis of said worm wheel, said worm wheel and said shaft engaging each other by means of threads having load bearing faces that are substantially radial with respect to the axis of said shaft.

4. Apparatus according to claim 3 wherein said threads are of buttress type.

5. Apparatus according to claim 3 wherein said threads are of acme type.

* * * * *